United States Patent
Asadullah et al.

(10) Patent No.: US 12,038,676 B2
(45) Date of Patent: Jul. 16, 2024

(54) AUTOMATED IMAGE CAPTURING APPARATUS AND SYSTEM THEREOF

(71) Applicant: Infosys Limited, Bangalore (IN)

(72) Inventors: Allahbaksh Mohammedali Asadullah, Hubli (IN); Mohammed Rafee Tarafdar, Karnataka (IN); Trijeet Kumar Modak, Hooghly (IN); Anant Yash Pande, Dhanbad (IN); Anupam Behera, Berhampur (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 17/517,026

(22) Filed: Nov. 2, 2021

(65) Prior Publication Data
US 2023/0004073 A1    Jan. 5, 2023

(30) Foreign Application Priority Data
Jun. 30, 2021    (IN) .............................. 202141029497

(51) Int. Cl.
| | |
|---|---|
| *G03B 17/56* | (2021.01) |
| *G03B 5/00* | (2021.01) |
| *G03B 17/12* | (2021.01) |
| *G06N 3/08* | (2023.01) |
| *H04N 23/61* | (2023.01) |
| *H04N 23/695* | (2023.01) |

(52) U.S. Cl.
CPC ............. *G03B 17/561* (2013.01); *G03B 5/00* (2013.01); *G03B 17/12* (2013.01); *G06N 3/08* (2013.01); *H04N 23/61* (2023.01); *H04N 23/695* (2023.01)

(58) Field of Classification Search
CPC .................................................... G03B 15/00
See application file for complete search history.

(56) References Cited

U.S. PATENT DOCUMENTS

| | | | | |
|---|---|---|---|---|
| 4,283,766 A | * | 8/1981 | Snyder ................... | H04N 5/222 348/E5.022 |
| 2012/0200860 A1 | * | 8/2012 | Gaspardo ................ | G06T 7/579 356/601 |
| 2020/0096316 A1 | | 3/2020 | Vinshtok et al. | |

FOREIGN PATENT DOCUMENTS

WO    2019227143 A1    12/2019

OTHER PUBLICATIONS

Extended European Search Report, dated May 25, 2022.
Indian Patent Application No. 202141029497, Examination Report, dated Feb. 10, 2023.

\* cited by examiner

*Primary Examiner* — Noam Reisner
(74) *Attorney, Agent, or Firm* — Troutman Pepper Hamilton Sanders LLP (Rochester)

(57) ABSTRACT

A system and apparatus for automated image capturing, comprising a microcontroller, an image capturing device operatively coupled to the pair of guiding apparatus using a first electric rotary actuator, a rotary plate operatively mounted on a second electric rotary actuator. The pair of guiding apparatus and the first electric rotary actuator is actuated to cause change in position of the image capturing device relative to an object positioned on the rotary plate and second electric rotary actuator is actuated causing change in angle of orientation of the object positioned on the rotary plate. By varying lighting conditions and for different background images, plurality of images of object are captured using the image capturing device by actuating electromechanical components of the apparatus.

15 Claims, 5 Drawing Sheets

AUTOMATED IMAGE CAPTURING APPARATUS AND SYSTEM THEREOF

This application claims the benefit of Indian Patent Application Serial No. 202141029497 filed Jun. 30, 2021, which is hereby incorporated by reference in its entirety.

FIELD

The present technique relates to automated image capturing apparatus. More specifically, the technique relates to automated image capturing techniques and apparatus to generate image data set for training machine learning models.

BACKGROUND

Machine learning and deep-learning training in the field of image recognition requires large volume of image data. Generating high quality datasets of target objects is a time-consuming effort. The present technology involves a large amount of human effort and time to collect the data for any object to train and identify the object through means of machines (Deep Learning). For example, for an Autonomous Retail store several images of an item are captured using a camera with human effort in different orientations, backgrounds, lighting conditions, occlusions etc. Based on this image data set, the system is trained to detect the item/object so that a seamless, cashier-less experience is provided. In case of Generative Adversarial Networks (GAN), the images generated are fake and sometimes they are of very low quality. This does not generate images for all scenarios and often results in more effort as GAN is still evolving. In cases where the training data need to be generated in the challenging physical condition, it is difficult for human to operate. Some of the existing technologies such as data augmentation techniques generate multiple variants of the image by modifying/transforming existing images to generate more and multiple variants of image dataset either my inducing noise or by altering pixels etc.

SUMMARY

As mentioned in the background, one of the solutions is to automate the process of capturing images of desired objects in varying lighting conditions and from different orientations in a short span of time to speed up the data collection process along with capturing plurality of images for multiple combinations of camera position, object position, lighting condition etc. in an automated manner in very short span of time.

Disclosed are a system, apparatus and method for automated image capturing by central computing system which is configured to control the position and operation of the camera, the orientation of the object and lighting of the environment.

In one aspect, a system for automated image capturing is disclosed. The system comprises components such as, but not limited to a microcontroller, a pair of guiding apparatus, an image capturing device operatively coupled to the pair of guiding apparatus using a first electric rotary actuator, a rotary plate operatively mounted on a second electric rotary actuator, at least one processor and at least one memory unit. The at least one processor is configured to actuate at least one of the pair of guiding apparatus and the first electric rotary actuator, through the microcontroller, to cause change in position of the image capturing device relative to an object positioned on the rotary plate and capture one or more images of the object positioned on the rotary plate. The one or more images are captured by the image capturing device for plurality of combinations of angle of orientation of object and position of the image capturing device. The at least one processor may also be configured to actuate the second electric rotary actuator through the microcontroller, causing change in angle of orientation of the object positioned on the rotary plate. The second electric rotary actuator is positioned at a predetermined distance from a position of the pair of guiding apparatus.

The system comprises another guiding apparatus actuated through the microcontroller, which comprises an occlusion object positioned between the rotary plate and the pair of guiding apparatus. The at least one processor is configured to display at least one background image through a display device. The above mentioned components are controlled by the at least one processor centrally through the microcontroller to capture one or more images of the object positioned on the rotary plate with plurality of combinations of position of the image capturing device, angle of orientation of the object, position of the occlusion object and the background image displayed on the display device positioned behind the object.

In another aspect, an apparatus for automated image capture is disclosed. The apparatus comprises one or more operatively coupled components such as, but not limited to a microcontroller, a first guiding apparatus, a second guiding apparatus, a third guiding apparatus, an image capturing device, a rotary plate and at least one processor. The second guiding apparatus is operatively coupled to the first guiding apparatus wherein the second guiding apparatus is mounted at an angle on the first guiding apparatus. The image capturing device is operatively coupled to the second guiding apparatus using a first electric rotary actuator. The rotary plate is operatively mounted on a second electric rotary actuator positioned at a predetermined distance from the first guiding apparatus. The third guiding apparatus comprising an occlusion object is positioned between the first guiding apparatus and the second electric rotary actuator.

The at least one processor is configured to send one or more instructions to the microcontroller which causes microcontroller to actuate the either or combination of, the first guiding apparatus, the second guiding apparatus, the third guiding apparatus, the first electric rotary actuator and the second electric rotary actuator. By sending instructions to the microcontroller, the at least one processor is configured to capture one or more images of an object positioned on the rotary plate, with or without occlusion object for plurality lighting conditions and plurality of background images displayed using a display unit.

In yet another aspect, a computer implemented method for automated image capture is disclosed. A processor may be configured to send one or more instructions to a microcontroller causing the microcontroller to perform one or more steps, comprising positioning the object, positioning the image capturing device and capturing one or more images of the object. The processor may send one or more instructions to the microcontroller which causes positioning an object at an angle of orientation by actuating an electric rotary actuator associated with a rotary plate. The processor may send one or more instructions to the microcontroller to actuate a guiding apparatus and an electric rotary actuator associated with image capturing device to position the image capturing device to point at the object. The processor may send one or more instructions to image capturing device to capture one or more images of the object. The method further comprising, positioning an occlusion object between the object and the image capturing device using a guiding apparatus. The one or more images are capture for plurality of combinations of angle of orientation of the object and position of the image capturing device.

The system, apparatus and/or method disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

One of the exemplary objectives of examples of this technology is to overcome the technical problem mentioned in the background section through a system, apparatus and method for automated image capturing by central computing system which is configured to control the position and operation of the camera, the orientation of the object and lighting of the environment, which automates and speed up the data collection process with more accuracy.

In one or more embodiments, a system, apparatus and/or a method for automated image capturing is disclosed. The system comprising components such as, but not limited to a microcontroller, a pair of guiding apparatus, an image capturing device operatively coupled to the pair of guiding apparatus using a first electric rotary actuator, a rotary plate operatively mounted on a second electric rotary actuator, at least one processor and at least one memory unit. The at least one processor may be configured to actuate at least one of the pair of guiding apparatus and the first electric rotary actuator, through the microcontroller, to cause change in position of the image capturing device relative to an object positioned on the rotary plate and capture one or more images of the object positioned on the rotary plate. The one or more images may be captured by the image capturing device for plurality of combinations of angle of orientation of object and position of the image capturing device. The at least one processor may also be configured to actuate the second electric rotary actuator through the microcontroller, causing change in angle of orientation of the object positioned on the rotary plate. The second electric rotary actuator may be positioned at a predetermined distance from a position of the pair of guiding apparatus.

The system further comprises another guiding apparatus actuated through the microcontroller, which comprises an occlusion object positioned between the rotary plate and the pair of guiding apparatus. The at least one processor is configured to display at least one background image through a display device. The above mentioned components are controlled by the at least one processor centrally through the microcontroller capture to one or more images of the object positioned on the rotary plate with plurality of combinations of position of the image capturing device, angle of orientation of the object, position of the occlusion object and the background image displayed on the display device positioned behind the object.

Figure 1:
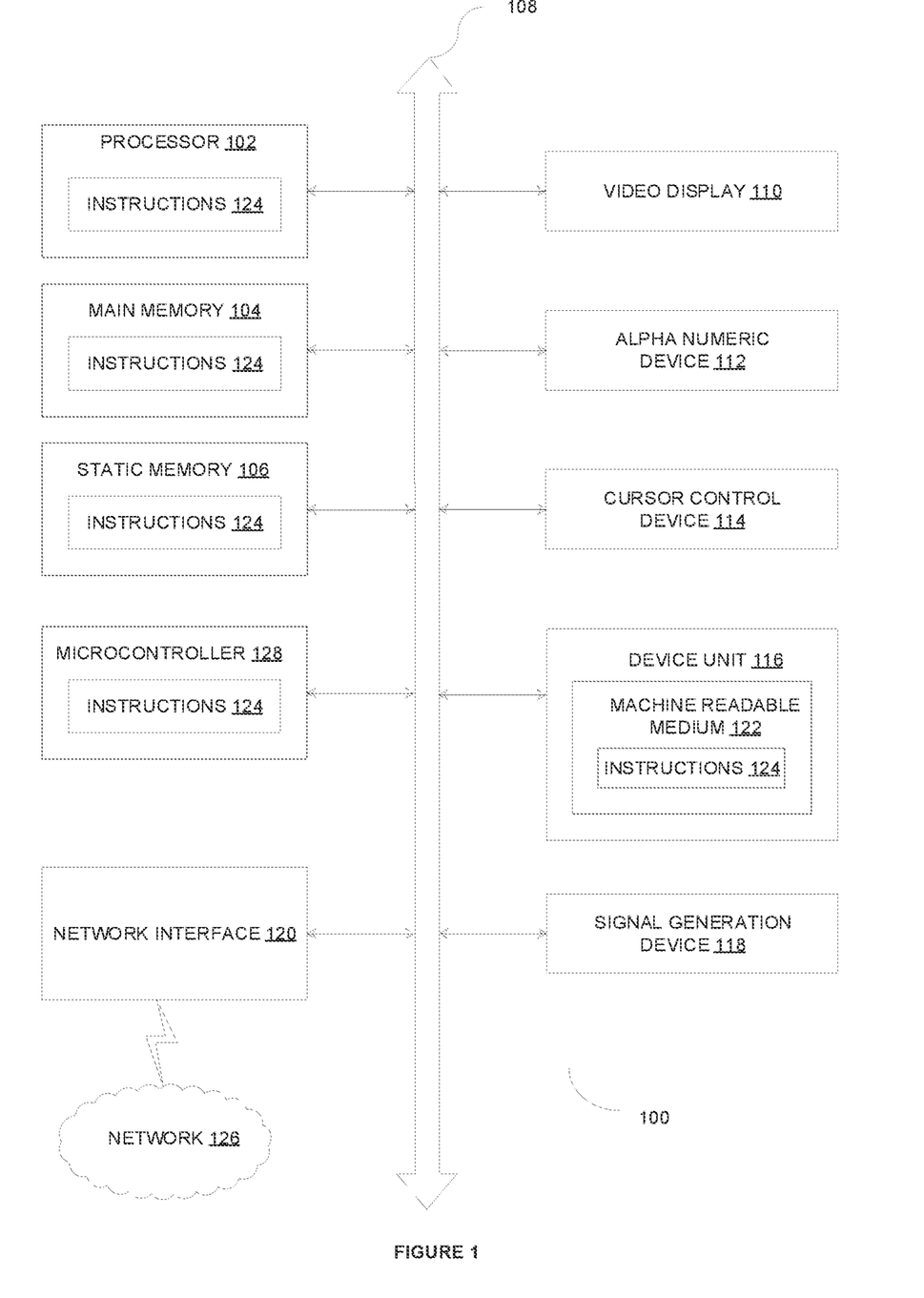
FIG. 1 is a diagrammatic representation of a data processing system capable of processing a set of instructions to perform any one or more of the methodologies herein, according to one or more embodiments.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), a network interface 120 and a microcontroller 128.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
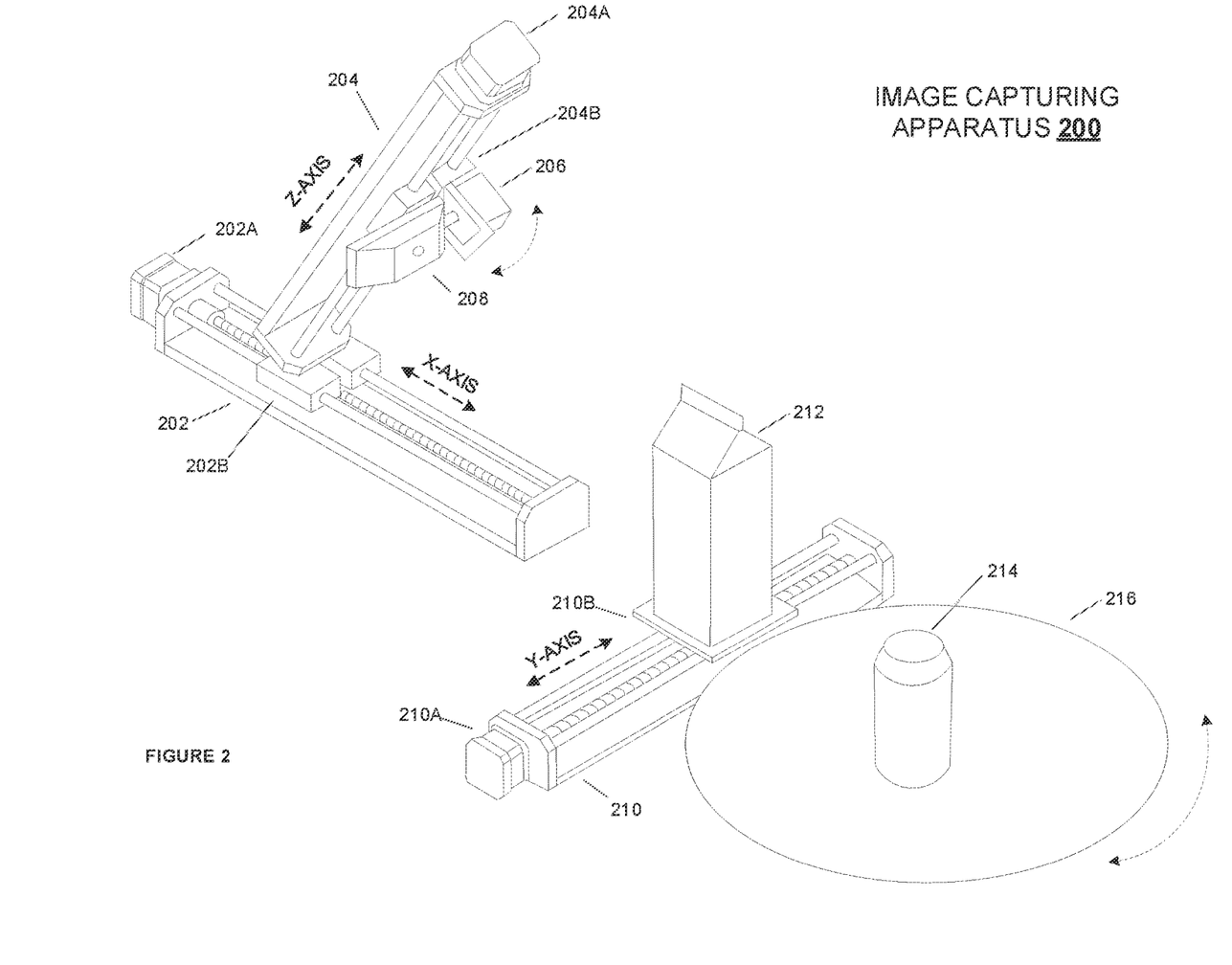
FIG. 2 is a diagrammatic representation of exemplary assembly of various components of automated image capturing apparatus, according to one or more embodiments.

FIG. 2 is a diagrammatic representation of exemplary assembly of various components of automated image capturing apparatus, according to one or more embodiments. In one or more embodiments, the automated image capturing apparatus 200 comprises one or more components, but not limited to, a first guiding apparatus 202, a second guiding apparatus 204, a third guiding apparatus 210, a first electric rotary actuator 206, an image capturing device 208, an occlusion object 212, an object 214 (also referred as 'target object') of which plurality of images to be captured and a rotary plate 216.

In one or more embodiments the first guiding apparatus 202 may be an electro-mechanical linear guide which provides linear motion by re-circulating rolling elements between a profiled rail and a bearing block 202B, wherein the linear motion is achieved using a stepper motor 202A which is actuated by sending one or more instructions through the microcontroller 128 by the processor 102. The second guiding apparatus 204 may be an electro-mechanical linear guide mechanically and operatively coupled to the first guiding apparatus 202 wherein the second guiding apparatus 204 is mounted on the bearing block 202B of the first guiding apparatus 202 at an angle which is measured along the axis of movement of the bearing block 202B of the first guiding apparatus 202. The second actuating apparatus 204 comprises a stepper motor 204A and bearing block 204B wherein the bearing block 204B moves along profiled rail of the second actuating apparatus 204, wherein the movement is achieved by actuating the stepper motor 204A by sending one or more instructions to the stepper motor 204A through the microcontroller 128 by the processor 102. The angle at which the second guiding apparatus 204 mounted on the first guiding apparatus 202 may be adjusted to any degree between 45° to 60°, based on preferred view angle of the target object.

Figure 2A:
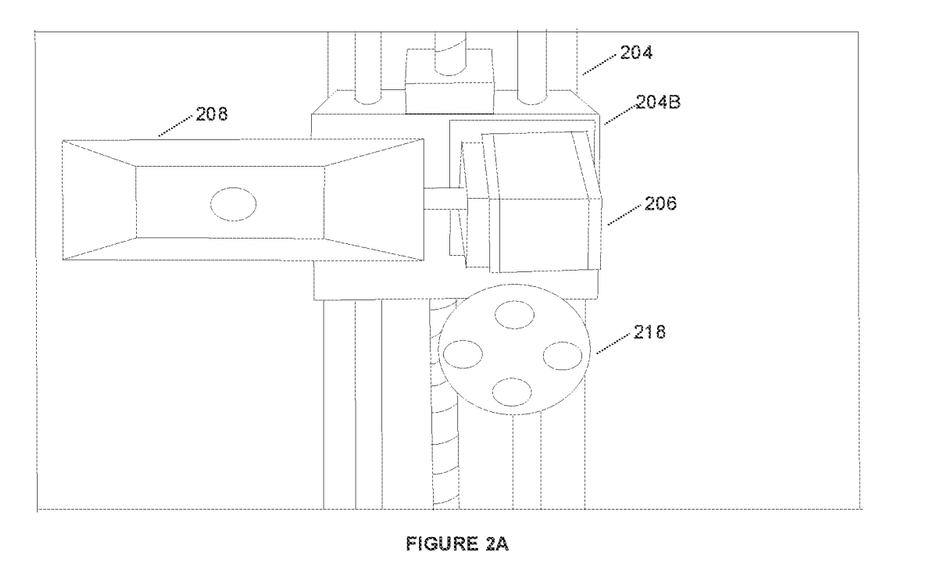
FIG. 2A is a diagrammatic representation of front view perspective of the image capturing device and electric rotary actuator associated with the image capturing device, according to one or more embodiments.

The image capturing device 208 may be operatively coupled to the bearing block 204B of the second guiding apparatus 204 using the first electric rotary actuator 206 as illustrated in FIG. 2 and FIG. 2A. Referring to FIG. 2A which is a diagrammatic representation of front view perspective of the image capturing device 208 and the first electric rotary actuator 206 associated with the image capturing device 208, according to one or more embodiments. The image capturing device 208 may be operatively coupled to first electric rotary actuator 206 which is in turn physically coupled to the bearing block 204B of the second guiding apparatus 204. The bearing block 204B of the second guiding apparatus 204 may be equipped with a lighting component 218, which is a light source operated by sending one or more instructions from the microcontroller 128.

Referring to FIG. 2, a rotary plate 216 may be positioned at a predetermined distance from the first guiding apparatus 202. Further, a third guiding apparatus 210 may be positioned between the first guiding apparatus 202 and the rotary plate 216. The third guiding apparatus 210 comprises a stepper motor 210A and a bearing block 210B wherein the movement of the bearing block 210B is achieved by actuating the stepper motor 210A by sending one or more instructions through the microcontroller 128 by the processor 102. An occlusion object 212 may be physically positioned (mounted) on the bearing block 210B of the third guiding apparatus 210. The object 214 may be positioned on the rotary plate 216.

Figure 2B:
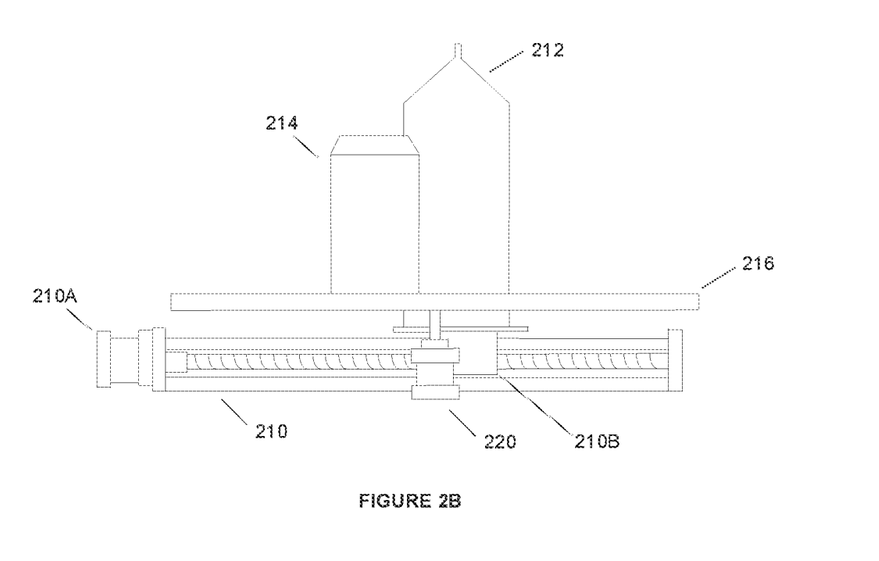
FIG. 2B is a diagrammatic representation of a perspective view of a guiding apparatus comprising occlusion object and electric rotary actuator comprising object of which image to be captured, according to one or more embodiments.

Referring to FIG. 2B which is a diagrammatic representation of a perspective view of the third guiding apparatus 210 comprising occlusion object 212 and a second electric rotary actuator 220 comprising a rotary plate 216 on which object 212 of which image to be captured is placed, according to one or more embodiments. The assembly of various components of the image capturing apparatus 200 is described in subsequent paragraphs.

Referring to FIG. 2, as mentioned in previous paragraphs, the second guiding apparatus 204 is mounted on the bearing block 202B of the first guiding apparatus 202 at an angle which is measured along the axis of movement of the bearing block 202B of the first guiding apparatus 202. For the reference purpose, the direction is which the profiled rail of the first guiding apparatus 202 is present may be considered as 'x' axis. The bearing block 202B of the first guiding apparatus 202 may be configured to move along the profiled rail in a first direction and a direction opposite to the first direction which may result in movement of the second guiding apparatus 204 mounted on the bearing block 202B of the first guiding apparatus 202. As illustrated in FIG. 2 and FIG. 2A, the electric rotary actuator 206 may be physically coupled to the bearing block 204B of the second guiding apparatus 204. The image capturing device 208 may be operatively coupled to the first electric rotary actuator 206. Both the image capturing device 208 and the first electric rotary actuator 206 may be configured to move along the direction of the rails of the second guiding apparatus 204, based on the instructions executed by the microcontroller 128. The image capturing device 208 may be configured to rotate within the pre-defined range of angles along the axis perpendicular axis of the direction of movement of the bearing block 204B of the second guiding apparatus 204. The third guiding apparatus 210 may be positioned in front of the first guiding apparatus as illustrated in FIG. 2, in a direction perpendicular to the direction of movement of bearing block 202B of the first guiding apparatus 202. An occlusion object 212 may be positioned on top of the bearing block 210B of the third guiding apparatus 210. A rotary plate 216 may be positioned adjacent to the third guiding apparatus 210 (as illustrated in FIG. 2 and FIG. 2B) wherein the object 214 may be positioned on top of the rotary plate 214.

As illustrated in FIG. 2B, the rotary plate 216 may be operatively mounted on the second electric rotary actuator 220 which is configured to receive one or more instructions from the microcontroller 128 for operation. The rotary plate 216 may be configured to move either in clockwise direction or anti-clockwise direction while capturing the image of object 214 positioned on the rotary plate 216.

As illustrated in FIG. 2, the third guiding apparatus 210 maybe positioned between the first guiding apparatus 202 and the rotary plate 216 comprising object 214. The third guiding apparatus 210 may be positioned at a predetermined distance form the first guiding apparatus 202. The rotary plate 216 may be positioned at a predetermine distance from the first guiding apparatus 202. The predetermined distance may be calculated based on at least one of, but not limited to, focal length of the image capturing device 208 and/or the field of view value of the image capturing device 208 so that the images of the object 214 captured by the images capturing device 208 with or without the occlusion object 214 is always within the focal length range of the image capturing device 208.

In one or more embodiments, the first guiding apparatus 202, the second guiding apparatus 204, the third guiding apparatus 210, the first electric rotary actuator 206, the rotary plate 216 through the second electric rotary actuator 220, and/or the lighting component 218 may be centrally controlled and actuated through microcontroller 128 by sending one or more instructions from the processor 102. The image capturing apparatus 200 may also comprise a background display unit (also referred as background display device) positioned behind the object 214 or the rotary plate 216 (not illustrated in figures) configured to display plurality of background images while capturing images of the object 214. Plurality of background images may be stored in a database and at least one image may be fetched from the database to be displayed as background images at the background display unit while capturing images of the object 214.

Based on the one or more instructions sent by the processor 102, the microcontroller 128 may be configured to actuate the stepper motor 202A of the first guiding apparatus 202 which causes the bearing block 202B of the first guiding apparatus 202 to move in a first direction and in a direction opposite to the first direction along the axis of the railings of the first guiding apparatus 202. For example, the first direction of movement may be the movement of the bearing block 202B of the first guiding apparatus 202 towards the object 214 positioned in front of the image capturing device 208. The direction opposite to the first direction of movement may be the movement of the bearing block 202B of the first guiding apparatus 202 away from the object 214 positioned in front of the image capturing device 208. For the reference purpose, the direction is which the profiled rail of the first guiding apparatus 202 is present may be considered as 'x' axis.

Based on the one or more instructions sent by the processor 102, the microcontroller 128 may be configured to actuate the stepper motor 204A of the second guiding apparatus 204 which causes the bearing block 204B of the second guiding apparatus 204 to move in a second direction and a direction opposite to the second direction along the axis of the railings of the second guiding apparatus 204. For example, the second direction of movement may be the movement of the bearing block 204B of the second guiding apparatus 204 towards the first guiding apparatus 202. The direction opposite to the second direction of movement may be the movement of the bearing block 204B of the second guiding apparatus 204 away from the first guiding apparatus 202. The actuation of the second guiding apparatus 204 may in turn cause the movement of first electric rotary actuator 206, the image capturing device 208 and the lighting system 218, along with the movement of the bearing block 204B of the second guiding apparatus 204. For the reference purpose, the direction is which the profiled rail of the second guiding apparatus 204 is present may be considered as 'z' axis.

Based on the one or more instructions sent by the processor 102, the microcontroller 128 may be configured to actuate the stepper motor 210A of the third guiding apparatus 210 which causes the bearing block 210B of the third guiding apparatus 210 to move in a third direction and a direction opposite to the third direction along the axis of the railings of the third guiding apparatus 210. For the reference purpose, the direction is which the profiled rail of the third guiding apparatus 210 is present may be considered as 'y' axis. The actuation of the third guiding apparatus 210 may in turn cause the movement of occlusion object 212 positioned on the bearing block 210B of the third guiding apparatus 210 which may cause either partial obstruction or complete obstruction to the view of object 214 from the image capturing device 208, which helps in capturing images of the object 214 with obstacles/occlusion object to generate image data set for the machine learning models to train efficiently.

Based on the one or more instructions sent by the processor 102, the microcontroller 128 may be configured to actuate the first electric rotary actuator 206 which may cause angular movement of the image capturing device 208 along the axis of the second guiding apparatus 204 so that whatever may be the position of the image capturing device 208 along the axis of the second guiding apparatus 208, the image capturing device 208 remains focusing on the object 216 all the time. Also, the actuation of the first electric rotary actuator 206 may cause the image capturing device 208 to capture one or more images of the object 214 from various angles. In an example embodiment, the first electric rotary actuator 206 may be a servo motor.

Based on the one or more instructions sent by the processor 102, the microcontroller 128 may be configured to actuate the second electric rotary actuator 220 which may cause the rotary plate 216 to rotate either in clockwise or anti-clockwise direction which may cause the object 214 mounted on the rotary plate 216 to rotate. In an example embodiment, the second electric rotary actuator 220 may be a servo motor.

Based on the one or more instructions sent by the processor 102, the microcontroller 128 may be configured perform at least one of, but not limited to, switch on/off the lighting system 218, increase or decrease the brightness level of the lighting system 218, and/or change the color of the lighting system 218.

The processor 102 may be configured to send one or more instructions to the microcontroller 128 which causes microcontroller 128 to actuate the either or combination of, the first guiding apparatus 202, the second guiding apparatus 204, the third guiding apparatus 210, the first electric rotary actuator 208 and the second electric rotary actuator 220. Such actuation may cause at least one or combination of—movement of second guiding apparatus 204 along the first direction and/or direction opposite to the first direction, movement of the image capturing device 208 in a second direction and/or the direction opposite to the second direction, movement of the occlusion object 212 in a third direction and the direction opposite to the third direction, rotation of the rotary plate 216 either in a clockwise direction or an anti-clockwise direction and/or change in angle of orientation of the image capturing device 208 pointing at the object 214. As the above-mentioned components are actuated, the processor 102 may simultaneously send one or more instructions to the image capturing device 208 to capture plurality of images of the object 214 with or without the obstacle(s) caused by occlusion object 212 and with or without the background images being displayed at the background display unit, positioned in front of the image capturing device 208 (behind the rotary plate 216).

In one or more embodiments, during the image capture, at least one or combination of components are stopped at a position and rest of the components are actuated to capture images from plurality of combinations of angle, distance, orientation of the object 214, with or without occlusion object 212, for various lighting condition through lighting system 218 for various combination of background images.

In an example embodiment, consider the first guiding apparatus 202 is actuated causing the bearing block 202B to be stopped at position 'A' along the rails of the first guiding apparatus 202, and image capturing device 208 is stopped at position 'B' along the rails of the second guiding apparatus 204 and also the image capturing device 208 is positioned at an angle 'C' by actuating first electric rotary actuator 206, and the occlusion object is stopped at position 'D' along the rails of the third guiding apparatus 210, then the object 214 may be rotated for 360 degrees hence generating 360 or more images of the object 214 from all angles of rotation of rotary plate 216 at one particular position of image capturing device 208 for different lighting conditions and different background images. In another example embodiments, the object 214 may be stopped at one angle and at least one or combination of all other components are actuated to capture plurality of images of the object 214. As the variables are in terms of positions of first guiding apparatus 202, second guiding apparatus 204, third guiding apparatus 210, first electric rotary actuator 206, second electric rotary actuator 220, lighting conditions 218 and background display, numerous combinations of images can be captured in less time thereby providing automating image capturing process and eliminating human intervention. The steps to determine positions and angles are described in subsequent paragraphs of the present disclosure.

Figure 2C:
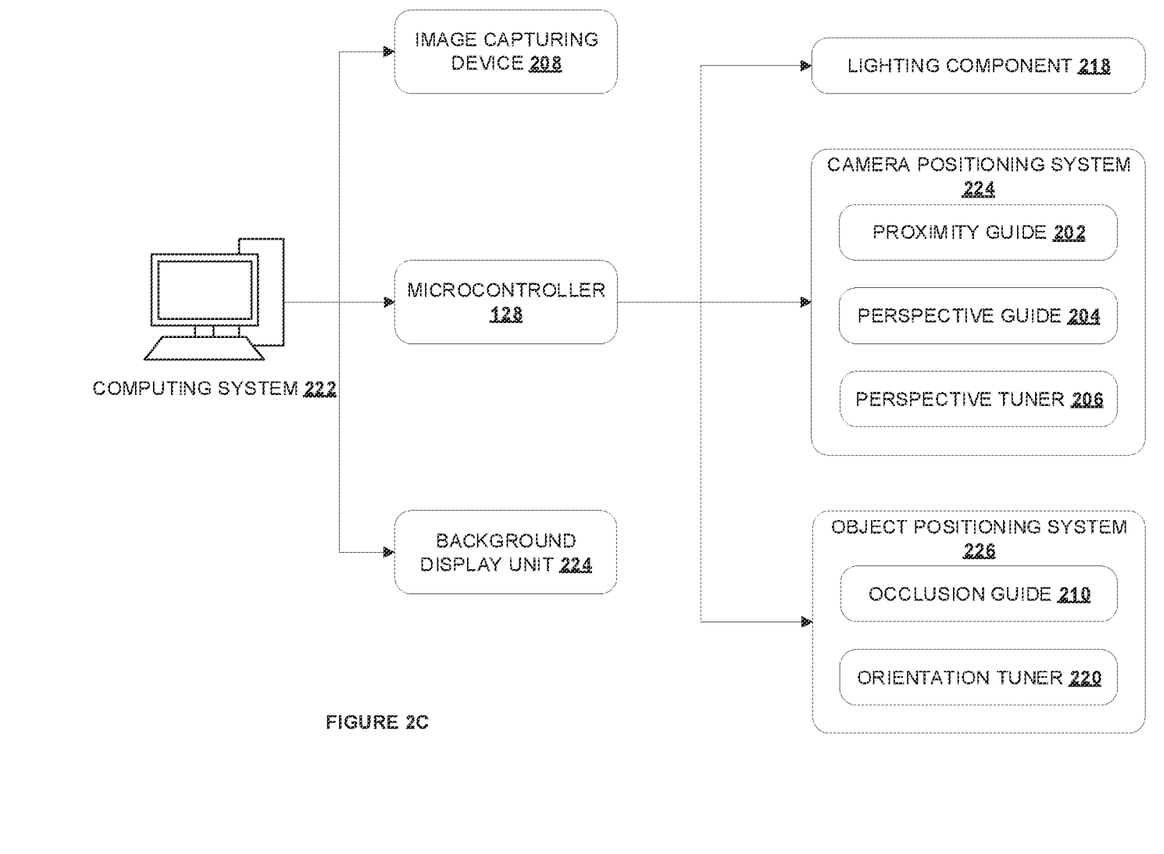
FIG. 2C is an architecture diagram illustrating various components of the system for automated image capturing, according to one or more embodiments.

In one or more embodiments, FIG. 2C illustrates an architecture of a system for autonomous image capture, according to one or more embodiments. The system comprises one or more components such as, but not limited to, a computing system 222 comprising a processor 102, an image capturing device 208, a microcontroller 128, a background display unit 224, a lighting component 218, a camera positioning system 224 and an object positioning system 226. The computing system 222 may be communicatively coupled to image capturing device 208, the microcontroller 128 and the background display unit 224. The computing system 222 may be communicatively coupled to the lighting component 218, the camera positioning system 224 and object positioning system 226 through the microcontroller 128.

In one or more embodiments, the computing system 222 may be a standard desktop, a single-board computer like Raspberry Pi or any such computing device comprising the processor 102 and capable of executing one or more instructions. The computing system 222 may execute one or more instructions that may calculate various states or actuation position of components that the system must achieve to capture and generate image dataset. In one or more embodiments, the image capturing device 208 may be communicatively coupled to the computing system 222 and may be configured to capture plurality of images by varying different parameters such as, but not limited to, resolution, shutter speed, aperture etc. In one or more embodiments, the background display unit 224 may be communicatively coupled to the computing system 222 and may be configured to display background images while generating image dataset through image capturing device 208. The background images and the metadata associated with the background images such as resolution, storage location information and information on type/format of the background images may be stored in a database associated with the computing system 222 and may be displayed using the background display unit 224.

In one or more embodiments, the microcontroller 128 may be operatively coupled to the computing system 222 either with a serial connection or Wi-Fi link and may be configured to communicate with computing system 222 and various other components of the system described in the present disclosure. The microcontroller 128 may be configured to send one or more instructions to components communicatively coupled to it, to achieve state or position based on one or more instructions received from the computing system 222 and return confirmation to the computing system 222 after execution of the instructed state or actuation position. The state here may refer to intended position of various components such as linear guides, electric rotary actuators, or the luminosity of color of the light component that the microcontroller is configured to achieve for image capture.

In one or more embodiments, the lighting component 218 may comprise Light Emitting Diodes (LED) array that is operatively coupled to the microcontroller 128. The required brightness and color is controlled by the microcontroller 128 which may receive the values for brightness of light and/or values for color of light from the computing system 222. The lighting component 218 may be mounted along with the camera (to the bearing block 204B of the second linear guide 204 as illustrated in FIG. 2 and FIG. 2A) so that the lighting system may always point at the object positioned using the object positioning system 226.

In one or more embodiments, the camera positioning system 224 may comprise pair of guiding apparatus i.e. a guiding apparatus—'x' axis 202 (also referred as an 'horizontal linear guide' 202 or a proximity guide 202), and a guiding apparatus 'z' axis 204 (also referred as a 'vertical linear guide' 204 or a perspective guide 204), and a first electric rotary actuator 206 (also referred as a perspective tuner 206). The object positioning system 226 may comprise guiding apparatus—'y' axis 210 (also referred as an occlusion guide 210) and a second electric rotary actuator 220 (an orientation tuner 220). The proximity guide 202 and the perspective guide 204 may be coupled to each other wherein the perspective guide 204 may be mounted on the proximity guide 202 at a predetermined angle. The perspective tuner 206 may be coupled to the perspective guide 204 and the image capturing device 208 may be operatively coupled to the perspective tuner 206. The proximity guide 202 may be actuated through a stepper motor 202A, the perspective guide 204 may be actuated through a stepper motor 204A. The perspective tuner 206 may be configured to actuate image capturing device 208, which may be a servo motor. The angle of orientation the image capturing device 208 may be changed/controlled using the servo motor to make sure that the image capturing device 208 always keeps the subject/object within the focus area/frame during the image capture. The actuation position of the servo motor i.e., the angle of orientation of the image capturing device may be calculated based on the angle between the proximity guide 202 and perspective guide 204, and the position of both the proximity guide 202 and perspective guide 204 with respect to rotary plate where the object is positioned.

The object positioning system 226 may comprise a guiding apparatus—'y' axis 210 (also referred as occlusion guide 210) and the second electric rotary actuator 220 (also referred as orientation tuner 220). The occlusion guide 210 may comprise an occlusion object wherein the occlusion object is mounted on the occlusion guide 210. The orientation tuner 220 may comprise a rotary plate on top of which the object is positioned, and the rotary plate may be operatively coupled to the orientation tuner 220. The lighting component 218 may be coupled to the perspective guide 204 and the background display unit 224 may be positioned behind the object. The assembly of the above-mentioned components are illustrated in FIG. 2, FIG. 2A and FIG. 2B.

The processor 102 may be configured to actuate either or combination of, the pair of guiding apparatus (the proximity guide 202 and the perspective guide 204) and the perspective tuner 206, through the microcontroller 128 to cause change in position of the image capturing device 208 relative to the object positioned on the rotary plate. The change in position of the image capturing device 208 may be because of actuation of at least one or combination of a proximity guide 202, perspective guide 204, and a perspective tuner 206, wherein the actuation is caused by sending one or more instructions from the processor 102 through the microcontroller 128 to the components mentioned above.

In one or more embodiments, the 'change in position' may indicate the movement of the bearing block of the proximity guide 202 from one position to another position along the axis of railings of the proximity guide 202 which causes the movement of the perspective guide 204 as the perspective guide 204 is mounted on the proximity guide 202. In one or more embodiments, the 'change in position' may also indicate the movement of bearing block of the of perspective guide 204 from one position to another position along the axis of railing of the perspective guide 204 which causes the movement of the perspective tuner 206 along with the image capturing device 208 since the perspective tuner 206 along with the image capturing device 208 are mounted to the bearing block of the perspective guide 204. In one or more embodiments, the 'change in position' may also indicate movement of image capturing device 208 in terms of angular rotation as the image capturing device 208 operatively coupled to the perspective tuner 206. The combination of above-mentioned 'change in position' may collectively result in change in position of the image capturing device 208 relative to the object positioned on the rotary plate.

In one or more embodiments, the processor 102 may be configured to actuate the orientation tuner 220 through the microcontroller 128 causing change in angle of orientation of the object positioned on the rotary plate. After the actuation, the processor 102 may be configured to send one or more instructions to the image capturing device 208 to capture plurality of images of the object positioned on the rotary plate. The one or more images are captured by the image capturing device 208 for plurality of combinations of angle of orientation of object, and the position and/or the angle of orientation of the image capturing device 208. The orientation tuner 220 is positioned at a predetermined distance from a position of the pair of guiding apparatus 202,204.

The object positioning system 226 may comprise the guiding apparatus 'y' axis 210 (also referred as the occlusion guide 210) comprises occlusion object and may be actuated through the microcontroller 128 which causes the movement of the occlusion object positioned on the bearing block of the occlusion guide 210 along the railings of the occlusion guide 210. The occlusion guide 210 may be positioned between the rotary plate and the pair of guiding apparatus 202,204. The processor 102 may be configured to display at least one background image through a background display unit 224 (also referred as 'display device') which may be positioned in front of the image capturing device 208 and behind the object position system 226 or the object. The above mentioned components are controlled by the processor 102 centrally through the microcontroller 128 to capture one or more images of the object positioned on the rotary plate with plurality of combinations of position of the image capturing device 208, angle of orientation of the object, position of the occlusion object and the background image displayed on the background display unit 224 positioned behind the object.

Figure 3:
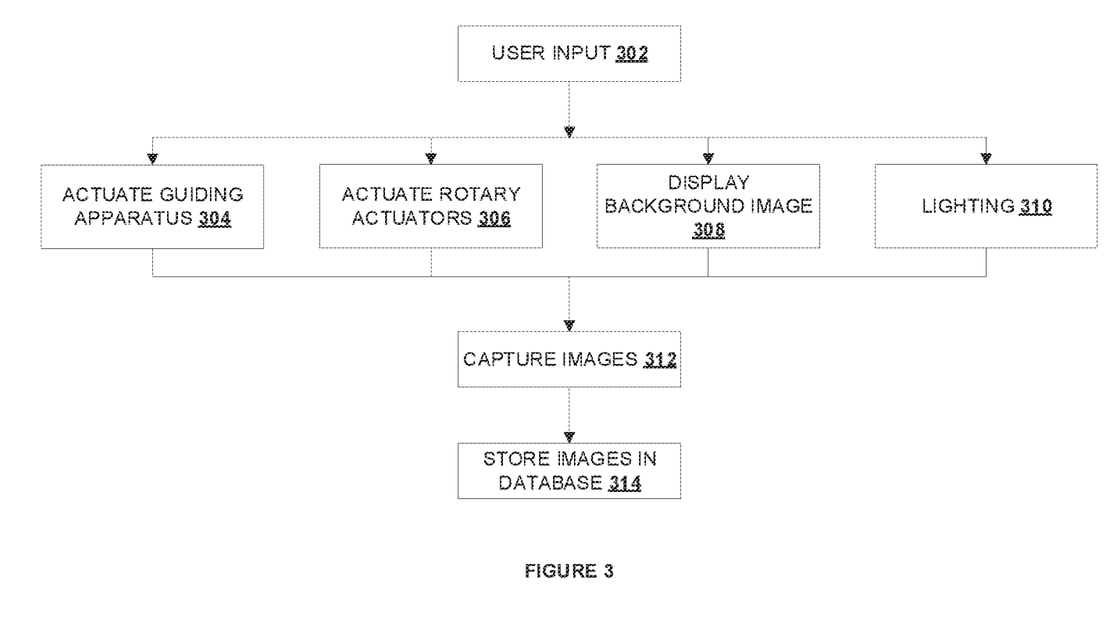
FIG. 3 is a process flow diagram illustrating a computer implemented method for automated image capturing, according to one or more embodiments.

FIG. 3 is a process flow diagram illustrating a computer implemented method for automated image capturing, according to one or more embodiments. A user input may be received at a central computing system to initiate the process of capturing images using automated image capturing apparatus, as in step 302. After receiving input from the user, the central computing system comprising at least one processor may send one or more instructions to a micro controller causing the micro controller to position the object and actuate components of the image capturing apparatus.

In one or more embodiments, the microcontroller may be configured to actuate guiding apparatus as, in step 304. The guiding apparatus may comprise proximity guide, perspective guide and an occlusion guide. The proximity guide may be a linear guide that is horizontally positioned, as described in various embodiments of the present disclosure. The perspective guide may be a linear guide that is vertically positioned on top of the proximity guide at a predetermined angle. The occlusion guide may be a linear guide or a circular guide that is positioned between the proximity guide and a rotary plate (may also be visualized as between the object and the image capturing device using). The occlusion guide may comprise occlusion object as illustrated in FIG. 2 and FIG. 2B.

In one or more embodiments, the microcontroller may be configured to actuate electric rotary actuators, as in step 306. The electric rotary actuators may comprise a perspective tuner and an orientation tuner. The perspective tuner which is coupled to the perspective guide may be a servo motor operatively coupled to an image capturing device, with a range of angle of orientation/rotation of image capturing device with respect to horizontal plane, represented as $A_{PT}$. The valid range of angles may be between 0 degree to 360 degrees, but in practical, the suitable range may be between 30 degrees and 120 degrees. The orientation tuner may be a servo motor with a range of angles represented as $A_{OT}$, operatively coupled to a rotary plate on top of which the object may be placed. The microcontroller may instruct orientation tuner to rotate, further causing rotation of the rotary plate operatively coupled to the orientation tuner. The rotation of the rotary plate may cause change in angle of orientation of the object placed on top of the rotary plate at an angle of orientation $A_{OT}$. The microcontroller may actuate the guiding apparatus (proximity guide and perspective guide) and an electric rotary actuator (perspective tuner) associated with image capturing device causing change in position/orientation of the image capturing device to point at the object.

The combination of step 304 and 306 may cause the positioning of the object placed on the rotary plate of the orientation tuner at an angle $A_{OT}$, positioning of perspective guide mounted on a proximity guide at a position/step $S_{PR}$, positioning of the perspective tuner coupled to the perspective guide at a position $S_{PE}$, positioning of the image capturing device at an angle $A_{PT}$. Linear guides are actuated using a stepper motor attached to it. Values of target positions may be provided as input to the microcontroller wherein the timing signals that is to be sent to the driver may be determined automatically by the microcontroller of the stepper motor which in turn sends the voltage required for the stepper motor to achieve the required number of rotations. The rotations of the stepper motor are translated as linear movement on the linear guide.

In an example embodiment, consider the linear guides have a slide range of 10 inches. The proximity guide may have a slide range between 0 inches (nearest to the target object) and 10 inches (farthest from the target object). The perspective guide may have a slide range between 0 inches (nearest to the floor or nearest to the proximity guide) and 10 inches (farthest from the floor or farthest from the proximity guide). The occlusion guide may have a slide range between 0 inches (towards far left from the view-point of image capturing device as illustrated in FIG. 2A) and 10 inches (towards to the far right from the view-point of image capturing device as illustrated in FIG. 2A). The perspective tuner may range between 0 degrees (where the camera would be pointing towards the foot of the perspective guide or the bearing block of the proximity guide) and 180 degrees (where the camera would be pointing towards the head of the perspective guide or the stepper motor of the perspective guide). The orientation tuner can rotate 360 degrees. The diameter of rotary plate operatively coupled to the orientation tuner should be chosen based on the degree of intended occlusion. A background image may be displayed using a display device that is positioned behind the object, as in step 308. One or lighting condition of various luminosity may be created by the at least one processor to emulate different environment conditions, as in step 310. Then the processor may be configured to send one or more instructions to image capturing device to capture plurality of images of the object for various positions of components mentioned in above paragraphs, as in step 312. In an example embodiment, to capture a batch of images of a single object, the following configuration may be used. The step value for the proximity guide may be set to intervals of 1 inches and with starting position as 0 inches, subsequent positions become as 1 inches, 2 inches, 3 inches, 4 inches, 5 inches, 6 inches, 7 inches, 8 inches, 9 inches and 10 inches which results in 11 steps or 11 different positions ($S_{PR}$) of the bearing block of the proximity guide. The step value for the perspective guide may be set to intervals of 2 inches and with the starting position as 1 inches, subsequent positions become as 3 inches, 5 inches, 7 inches and 9 inches which results in 5 steps or 5 different positions ($S_{PE}$) of the bearing block of the perspective guide. The step value for the occlusion guide may be set to intervals of 2 inches and with the starting position as 0 inches, subsequent positions become 2 inches, 4 inches, 6 inches, 8 inches and 10 inches which results in 6 steps or 6 different positions ($S_{OC}$) of the bearing block of the occlusion guide. The step value for the orientation tuner may be set to intervals of 5 degrees and with the starting position as 0 degrees, the resultant would be 72 steps or 72 different angular positions ($A_{OT}$) of the orientation tuner. The lighting condition through the lighting component may be set to vary with different light intensities such as 500 lumens, 700 lumens, 1100 lumens and 1300 lumens resulting in 5 step values. At least 10 background images may be fetched from the database to be displayed at the display device which results in 10 step values. For each of the above-mentioned configurations plurality of images may be captured by the image capturing device. For example, one of the above-mentioned step values is fixed and rest of the step values are modified to capture images. Other way round, at least one value is varied by keeping all other step values fixed. In the present example embodiment, considering one image is captured for each of the varying step values, the resultant number of images would be equal to multiplication of all the step values.

Figure 4:
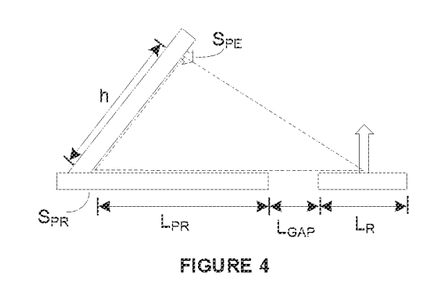
FIG. 4 is a diagrammatic representation of position of various components of the image capturing apparatus, according to one or more embodiments.
Figure 4A:
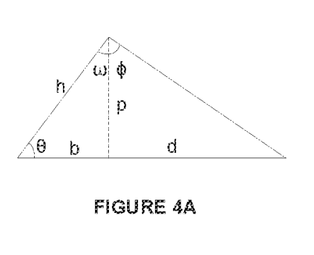
FIG. 4A is a diagrammatic representation of determining angle for the image capturing device, according to one or more embodiments.

It is to be noted that the angle $A_{PT}$ of image capturing device i.e. the perspective tuner needs to be corrected for every movement of the bearing block of the perspective guide or any changes in the step values mentioned above, so that the object remains within the focus and field of view of the image capturing device all the time for all the varying step values. For each change in step value $S_{PR}$ of the proximity guide and step value $S_{PE}$ of the perspective guide, the value of $A_{PT}$ needs to be determined and the perspective tuner needs to be actuated accordingly. The method of determination is illustrated in FIG. 4 and FIG. 4A. Let $L_{PR}$ be the distance between position of the bearing block of the of proximity guide and the end point of the proximity guide (the end point near the object), which also represents the length of range of motion of the bearing block of the proximity guide. Let $L_{PE}$ be the distance between position of the image capturing device and end point of the perspective guide which is mounted on the bearing block of the proximity guide, which also represents the length of range of motion of the perspective guide. The length range of motion of bearing block of occlusion guide be $L_{OG}$ and the distance between the proximity guide and outer edge of the rotary plate be $L_{GAP}$ as illustrated in FIG. 4. It is to be observed that the diameter of the rotary plate represented as $L_R$ is same as $L_{OG}$ and is positioned in such a way that the radius of the rotary plate is considered for calculation and object to be placed at the center of the rotary plate. As illustrated in FIG. 4A, the values are calculated as below:

$p = h \sin \theta$ $b = h \cos \theta$ $\omega = 90 - \theta$ $d = L_{PR} + L_{GAP} + \frac{1}{2}L_R - b$ $\phi = \tan^{-1}\frac{d}{p}$ $A_{PT} = \omega + \phi$ wherein,
- h is the value of $L_{PE}$;
- p is the vertical distance between image capturing device and axis of the proximity guide;
- b is the distance between one end of the proximity guide and intersection point of p with the axis of the proximity guide, as illustrated in FIG. 4A;
- ω is the angle made by the image capturing device with respect to p and h;
- d is the distance between the intersecting point of p with the axis of the proximity guide and the center of the rotary plate;
- θ is the angle at which the perspective guide is mounted on the proximity guide; and
- φ is the angle between p and the line representing distance between image capturing device and the center of the rotary plate, which is the focal length of the image capturing device; and $A_{PT}$ is the angle at which the image capturing device to be rotated using perspective tuner.

Whenever the other step values are changed, the value of $A_{PT}$ is determined and the image capturing device is tuned to angle $A_{PT}$ so that image capturing device points at the object every time. After adjusting the image capturing device through the microcontroller, the processor may send one or more instructions to the image capturing device to capture plurality of images of the object, as in step 312 for plurality of combinations of angle of orientation of the object and position of the image capturing device.

In an example embodiment, consider the below values: $L_{PE}=h=2.0$; $L_{PR}=2.5$; $L_{GAP}=1$; $L_{OG}=2.5$; $\theta=60$ degrees which is 1.0472 radians, then:

$$p=2.0 \sin 1.0472=1.7321$$

$$b=2.0 \cos 1.0472=1.0$$

$$\omega=1.5708-1.0472=0.5236$$

$$d = L_{PR} + L_{GAP} + \frac{1}{2}L_R - b = 3.75$$

$$\phi = \tan^{-1}\frac{d}{p} = 1.1381$$

$$A_{PT}=\omega+\phi=1.6617$$

The determined value of $A_{PT}$ will be in radians and when converted to degrees, the value of $A_{PT}$ will be 95.2087 degrees. The value of $A_{PT}$ may be provided as input to the microcontroller wherein the timing signals that is to be sent to the driver may be determined automatically which in turn sends the voltage required for the perspective tuner to achieve the required number of rotations achieve 95.2087 degrees angle for the image capturing device.

In another example embodiment, consider the perspective guide is actuated and is bearing block of the perspective guide is made to move to another position, say $L_{PE}=h=2.5$; and the rest of the values remains same, say $L_{PR}=2.5$; $L_{GAP}=1$; $L_{OG}=2.5$; $\theta=60$ degrees which is 1.0472 radians, then:

$$p=2.5 \sin 1.0472=2.1651$$

$$b=2.5 \cos 1.0472=1.2500$$

$$\omega=1.5708-1.0472=0.5236$$

$$d = L_{PR} + L_{GAP} + \frac{1}{2}L_R - b = 3.5$$

$$\phi = \tan^{-1}\frac{d}{p} = 1.0168$$

$$A_{PT}=\omega+\phi=1.5404$$

The determined value of $A_{PT}$ will be in radians and when converted to degrees, the value of $A_{PT}$ will be 88.2595 degrees. The value of $A_{PT}$ may be provided as input to the microcontroller wherein the timing signals that is to be sent to the driver may be determined automatically which in turn sends the voltage required for the perspective tuner to achieve the required number of rotations achieve 88.2595 degrees angle for the image capturing device. It is to be observed that increase in value of h has resulted in reduction in angle which makes the image capturing device to point the object without losing the view. The captured images along with the metadata information such as Exchangeable Image file Format (EXIF) data of the captures images may be stored in database as in step 314, which may further be used to train machine learning models such as, but not limited to image recognition models, object detection models. The captured images may be used train systems like assisted assorting of items, robot assisted shopping etc. The captures images can be used to train systems which recognizes items that customer has picked and adding to digital cart automatically.

In an example embodiment, the object (product) of the interest may be soft drink can, and obstacle image may be a milk tetra pack. The background image may be a sample image which illustrated assorted products in a brick-and-mortar retail store The plurality of images are may be captured as described in various embodiments of the present disclosure and may be used to train object detection model which can be used in adding products to cart of user automatically when they pick the product/item from shelves such as robot assisted shopping in retail stores The apparatus and/system disclosed herein will reduce the time and effort spent in data generation and collection phase as the variations in lighting conditions, orientations and occlusions are automatically handled. The fully automated robotic process as described in the present technology can generate significantly large volumes of image data as compared their human counterparts and increases training efficiency as large number of appropriate images will be available in short time.

The specification and drawings in the present disclosure are to be regarded in an illustrative rather than a restrictive sense.

What is claimed is:

1. A system for automated image capture, comprising:
   a microcontroller;
   a pair of guiding apparatus;
   an image capturing device operatively coupled to the pair of guiding apparatus using a first electric rotary actuator;
   a rotary plate operatively mounted on a second electric rotary actuator;
   another guiding apparatus, positioned between the rotary plate and the pair of guiding apparatus, wherein the another guiding apparatus further comprises an occlusion object and is positioned within a predetermined distance from one of the pair of guiding apparatus based on a focal length or a field of view of the image capturing device; and
   at least onea memory unit operatively coupled to at least one a processor, having instructions stored thereon that, when executed by the at least one processor, causes the at least one processor to:
      actuate, the pair of guiding apparatus or the first electric rotary actuator to cause change in position of the image capturing device relative to an object positioned on the rotary plate; and
      capture, one or more a plurality of images of the object positioned on the rotary plate.

2. The system of claim 1, wherein when the instructions when executed by the at least one processor, further causes cause the at least one processor to:
   actuate, the second electric rotary actuator, causing change in angle of orientation of the object positioned on the rotary plate.

3. The system of claim 1, wherein the another guiding apparatus when actuated moves the occlusion object to cause at least partial obstruction of the object during the capture of the one or more plurality of images.

4. The system of claim 1, wherein the at least one processor is further configured to display at least one background image through a display device.

5. The system of claim 1, wherein the second electric rotary actuator is positioned at a predetermined distance from a position of the pair of guiding apparatus.

6. The system of claim 1, wherein the one or more plurality of images are captured by the image capturing device for plurality of combinations of angle of orientation of the object and position of the image capturing device.

7. The system of claim 1, further comprising a lighting system, wherein the instructions when executed by the processor, further cause the processor to vary a brightness and a color of the lighting system, and wherein the plurality of images are captured by the imaging capturing device for a plurality of combinations of the brightness and the color of the lighting system.

8. The system of claim 7, wherein the instructions when executed by the processor further cause the processor to display a plurality of background images, through a display device positioned behind the object, and wherein the plurality of images are captured by the imaging capturing device for the plurality of combinations of the brightness of the lighting system, the color of the lighting system, and the plurality of background images.

9. The system of claim 8, wherein the instructions when executed by the processor further cause the processor to actuate, the second electric rotary actuator, causing change in angle of orientation of the object positioned on the rotary plate, wherein the rotary plate is rotated 360 degrees based on the actuation of the second electric rotary actuator, and wherein the captured plurality of images correspond to the plurality of combinations of the brightness of the lighting system, the color of the lighting system, and the plurality of background images for each degree of rotation of the rotary plate.

10. An apparatus for automated image capture, comprising:
   a microcontroller;
   a first guiding apparatus;
   a second guiding apparatus operatively coupled to the first guiding apparatus, wherein the second guiding apparatus is mounted at an angle on the first guiding apparatus;
   an image capturing device operatively coupled to the second guiding apparatus using a first electric rotary actuator;
   a rotary plate operatively mounted on a second electric rotary actuator positioned at a predetermined distance from the first guiding apparatus;
   a third guiding apparatus, positioned between the rotary plate and the pair of guiding apparatus, wherein the third guiding apparatus further comprises an occlusion object and is positioned within a predetermined distance from one of the first and second guiding apparatuses based on a focal length or a field of view of the image capturing device; and
   at least one a processor configured to capture one or more a plurality of images of an object positioned on the rotary plate by sending one or more instructions to the microcontroller.

11. The apparatus of claim 10, wherein the third guiding apparatus when actuated moves the occlusion object to cause at least partial obstruction of the object during the capture of the one or more plurality of images.

12. The apparatus of claim 10, wherein, sending one or more instructions to the microcontroller causes the microcontroller to actuate at least one of the first guiding apparatus, the second guiding apparatus, the third guiding apparatus, the first electric rotary actuator or the second electric rotary actuator.

13. A computer implemented method for automated image capture, comprising:
   communicating, by a processor, one or more instructions to a microcontroller causing the microcontroller to perform steps comprising:
   positioning, through the microcontroller, an object at an angle of orientation by actuating an electric rotary actuator associated with a rotary plate; and
   actuating, through the microcontroller, a pair of guiding apparatus and an electric rotary actuator associated with image capturing device to position the image capturing device to point at the object;
   positioning another guiding apparatus between the rotary plate and the pair of guiding apparatus, wherein the another guiding apparatus further comprises an occlusion object and is positioned within a predetermined distance from one of the pair of guiding apparatus based on a focal length or a field of view of the image capturing device; and
   instructing, by the processor, the image capturing device to capture one or more a plurality of images of the object.

14. The computer implemented method of claim 13, further comprising:
   positioning, through the microcontroller, the occlusion object between the object and the image capturing device using the guiding apparatus.

15. The computer implemented method of claim 13, wherein the one or more plurality of images are captured for plurality of combinations of angle of orientation of the object and position of the image capturing device.

* * * * *